(12) United States Patent
Desilets-Benoit et al.

(10) Patent No.: US 11,574,149 B2
(45) Date of Patent: Feb. 7, 2023

(54) SYSTEM AND METHOD FOR CLASSIFYING PASSIVE HUMAN-DEVICE INTERACTIONS THROUGH ONGOING DEVICE CONTEXT AWARENESS

(71) Applicant: CONTXTFUL TECHNOLOGIES INC., Montreal (CA)

(72) Inventors: Alexandre Desilets-Benoit, Montreal (CA); Bruno Falardeau, Verdun (CA); Raymond Poitras, Deux Montagnes (CA); Maria Virginia Ruiz-Blondet, Johnson City, NY (US); Felix Leger, Verdun (CA)

(73) Assignee: CONTXTFUL TECHNOLOGIES INC., Montreal (CA)

( * ) Notice: Subject to any disclaimer, the term of this patent is extended or adjusted under 35 U.S.C. 154(b) by 0 days.

(21) Appl. No.: 16/647,065

(22) PCT Filed: Nov. 14, 2018

(86) PCT No.: PCT/CA2018/051144
§ 371 (c)(1),
(2) Date: Mar. 13, 2020

(87) PCT Pub. No.: WO2019/051606
PCT Pub. Date: Mar. 21, 2019

(65) Prior Publication Data
US 2020/0210781 A1    Jul. 2, 2020
US 2021/0182623 A9    Jun. 17, 2021

Related U.S. Application Data

(60) Provisional application No. 62/559,299, filed on Sep. 15, 2017.

(51) Int. Cl.
*G06K 9/62*    (2022.01)
*G06N 20/00*   (2019.01)
(Continued)

(52) U.S. Cl.
CPC ............ *G06K 9/6264* (2013.01); *G06F 3/011* (2013.01); *G06K 9/6269* (2013.01);
(Continued)

(58) Field of Classification Search
CPC ............. G06K 9/6264; G06K 9/00335; G06K 9/6269; G06K 9/6274; G06N 20/00; G06F 3/011
See application file for complete search history.

(56) References Cited

U.S. PATENT DOCUMENTS 8,170,656 B2 *  5/2012  Tan ......................... G06F 3/015
                                                       600/546
8,417,715 B1 *  4/2013  Bruckhaus ......... G06Q 30/0202
                                                       707/758

(Continued)

OTHER PUBLICATIONS

Extended European Search Report in EP Patent Application No. 18855434.9, dated May 11, 2021; 10 pages.
(Continued)

*Primary Examiner* — Roland J Casillas
(74) *Attorney, Agent, or Firm* — Schmeiser, Olsen & Watts LLP

(57) ABSTRACT

A system and method are provided that use context awareness with device-dependent training to improve precision while reducing classification latency and the need for additional computing, such as by relying on cloud-based processing. Moreover, the following can leverage signal analysis with multiple sensors and secondary validation in a multi-modal approach to track passive events that would otherwise be difficult to identify using classical methods. In at least one implementation, the system and method described herein can leverage low power sensors and integrate already available human behavior in modular algorithms isolating specific context to reduce user interact time and training to a minimum.

12 Claims, 13 Drawing Sheets

(51) Int. Cl.
*G06F 3/01* (2006.01)
*G06V 40/20* (2022.01)

(52) U.S. Cl.
CPC ........... *G06K 9/6274* (2013.01); *G06N 20/00* (2019.01); *G06V 40/20* (2022.01)

(56) References Cited

U.S. PATENT DOCUMENTS

| | | | | |
|---|---|---|---|---|
| 8,935,119 | B2* | 1/2015 | Yuen | G01J 1/00 |
| | | | | 702/138 |
| 9,037,530 | B2* | 5/2015 | Tan | A61B 5/6824 |
| | | | | 706/62 |
| 9,079,060 | B2* | 7/2015 | Hong | A61B 5/02416 |
| 9,495,052 | B2* | 11/2016 | Shepelev | G06F 3/04162 |
| 9,560,094 | B2* | 1/2017 | Pal | H04L 67/306 |
| 9,612,661 | B2* | 4/2017 | Wagner | G06F 3/017 |
| 10,798,438 | B2* | 10/2020 | Conrad | H04N 21/42203 |
| 10,817,530 | B2* | 10/2020 | Siebel | G06Q 10/06 |
| 10,842,407 | B2* | 11/2020 | Berenzweig | G06N 5/04 |
| 10,905,350 | B2* | 2/2021 | Berenzweig | G06K 9/00355 |
| 2007/0101274 | A1* | 5/2007 | Kurlander | H04L 67/06 |
| | | | | 715/744 |
| 2011/0096036 | A1* | 4/2011 | McIntosh | G06F 3/043 |
| | | | | 345/177 |
| 2012/0188158 | A1* | 7/2012 | Tan | G06F 3/017 |
| | | | | 345/156 |
| 2012/0194553 | A1* | 8/2012 | Osterhout | G06F 3/011 |
| | | | | 345/633 |
| 2013/0072795 | A1* | 3/2013 | Mo | A61B 8/14 |
| | | | | 600/443 |
| 2013/0127616 | A1* | 5/2013 | Robitaille | G08C 17/02 |
| | | | | 340/539.13 |
| 2013/0173926 | A1* | 7/2013 | Morese | G06F 21/32 |
| | | | | 713/186 |
| 2014/0046185 | A1* | 2/2014 | Mo | A61B 8/469 |
| | | | | 600/443 |
| 2014/0067730 | A1* | 3/2014 | Kozloski | G06N 7/005 |
| | | | | 706/12 |
| 2014/0305204 | A1* | 10/2014 | Hong | A61B 5/7264 |
| | | | | 73/504.08 |
| 2014/0351337 | A1* | 11/2014 | Pal | H04L 67/306 |
| | | | | 709/204 |
| 2015/0006246 | A1* | 1/2015 | Ramaswamy | G06F 21/10 |
| | | | | 705/7.29 |
| 2015/0039239 | A1* | 2/2015 | Shuler | G16H 40/67 |
| | | | | 702/19 |
| 2015/0366504 | A1* | 12/2015 | Connor | A61B 5/6804 |
| | | | | 600/301 |
| 2016/0162674 | A1* | 6/2016 | Friedman | G06F 21/32 |
| | | | | 340/5.52 |
| 2016/0179242 | A1* | 6/2016 | Shepelev | G06F 3/0445 |
| | | | | 345/174 |
| 2016/0195928 | A1* | 7/2016 | Wagner | G06F 1/163 |
| | | | | 345/156 |
| 2016/0203036 | A1* | 7/2016 | Mezic | G06F 11/079 |
| | | | | 714/819 |
| 2016/0300054 | A1* | 10/2016 | Turgeman | G06F 21/36 |
| 2016/0334866 | A9* | 11/2016 | Mazed | G06K 9/00268 |
| 2017/0006135 | A1* | 1/2017 | Siebel | H04L 69/40 |
| 2017/0060369 | A1* | 3/2017 | Goyal | H04L 12/2823 |
| 2017/0188079 | A1* | 6/2017 | Conrad | H04N 21/42203 |
| 2017/0199874 | A1* | 7/2017 | Patel | H04W 4/023 |
| 2017/0316487 | A1* | 11/2017 | Mazed | G06Q 30/02 |
| 2019/0057777 | A1* | 2/2019 | Joshi | A61B 5/7221 |
| 2019/0158972 | A1* | 5/2019 | Messier | G10L 19/018 |
| 2020/0053415 | A1* | 2/2020 | Redmond | H04N 21/26225 |
| 2020/0117900 | A1* | 4/2020 | Deng | H04W 4/02 |
| 2020/0210781 | A1* | 7/2020 | Desilets-Benoit | G06K 9/6269 |
| 2020/0349210 | A1* | 11/2020 | Kawamoto | G06F 11/3438 |

OTHER PUBLICATIONS

Ehatisham-Ul-Haq, et al., "Authentication of Smartphone Users Based on Activity Recognition and Mobile Sensing", Sensors, Sep. 6, 2017, vol. 17, No. 9, p. 2043.

* cited by examiner

SYSTEM AND METHOD FOR CLASSIFYING PASSIVE HUMAN-DEVICE INTERACTIONS THROUGH ONGOING DEVICE CONTEXT AWARENESS

CROSS-REFERENCE TO RELATED APPLICATION(S)

This application claims the benefit of priority to U.S. Provisional Patent Application No. 62/559,299 filed on Sep. 15, 2017, the contents of which are incorporated herein by reference.

TECHNICAL FIELD

The following relates to systems and methods for classifying passive human-device interactions through ongoing device context awareness.

BACKGROUND

Human-device interactions, also known as human-computer interactions (HCIs), are typically considered important to providing a positive user experience. Various solutions have been proposed to improve these interactions, e.g., by focusing on triggers to identify discrete changes in state, then classifying these changes against a large database of statistical behaviors to predict how or for what the user is intending to interact with the device. Other solutions focus on activity tracking with direct measurements of physical parameters, or menus and additional user interfaces to create interactions with the end user.

While these solutions have arguably improved some human-device interactions, there can be issues with classification latency, the need for additional (e.g. cloud-based) processing, and limits to the accuracy of the predictions made by the device. Moreover, these solutions have been found to rely on power hungry hardware such as tactile screens/cameras and require time consuming navigation to access specific information or have a learning curve for the end user.

It is also found that current solutions typically leverage past technology that either rely on screen-only data such as "what fraction of the content was in the field of view?" or "how long was is in the field of view?"; or past behaviours such as "what was browsed previously?" or "age, gender, location". These solutions therefore do not have a way of measuring engagement or context on mobile devices in the same way that they could on desktop computers, with mouse movements. Also, these solutions tend to struggle with adverse contexts that were previously impossible as users were comfortably seated at home. In this context, knowing when is the best moment to reach a user is currently considered to be very difficult if possible at all.

It has also been found that fraudulent mobile traffic is more and more prevalent. Some statistics suggest that up to 40% of mobile traffic is fraudulent. Current technologies are found to be struggling to identify the sources of this fraudulent traffic, for example, click-farms and bots, leading to potential waste of resources on the fraudulent traffic. There exist ways of finding fraud in the desktop domain, based on mouse behaviour, but mobile devices currently do not expose passive user behaviour that would enable similar tracking. Because of this, it is found that there lacks an efficient way of identifying fraud in the mobile domain.

Users are also becoming more aware of privacy issues, and are reluctant to share private data on the internet or in mobile networks. As a result, browsers are known to be dropping cookies, restricting location data, and forcing advertisers, publishers and marketers to request consent from users. There is a need for an anonymous and ubiquitous way of understanding the contextual parameters of users in order to communicate efficiently with them.

Users are also being served content seamlessly on platforms and expect their devices to anticipate their needs pre-emptively. However, without contextual information, providers (e.g., OEMs, marketplaces, apps, websites, etc.) are found to be struggling to be truly ubiquitous. To provide goods, services, suggestions and user experiences these providers are leveraging psycho/socio/geo data points, but it is considered to not be fully leveraging available modalities and data in order to obtain contextual information.

It is an object of the following to address at least one of the above-noted issues or disadvantages.

SUMMARY

The following provides a system and method that uses context awareness with device-dependent training to improve precision while reducing classification latency and the need for additional computing, such as by relying on cloud-based processing. Moreover, the following can leverage signal analysis with multiple sensors and secondary validation in a multi-modal approach to track passive events that would otherwise be difficult to identify using classical methods. In at least one implementation, the system and method described herein can leverage low power sensors and integrate already available human behavior in modular algorithms isolating specific context to reduce user interact time and training to a minimum.

In one aspect, there is provided a method of interacting with a device, comprising: obtaining one or more passive inputs from one or more sensors on or coupled to the device; analyzing the passive inputs using one or more algorithms to generate a signature for a phenomenon associated with the passive inputs; and applying the signature to a pre-trained artificial intelligence algorithm to generate feedback for interacting with the device.

In other aspects, there are provided systems and computer readable media configured to perform the method.

BRIEF DESCRIPTION OF THE DRAWINGS

Embodiments will now be described with reference to the appended drawings wherein.

DETAILED DESCRIPTION

Figure 1:
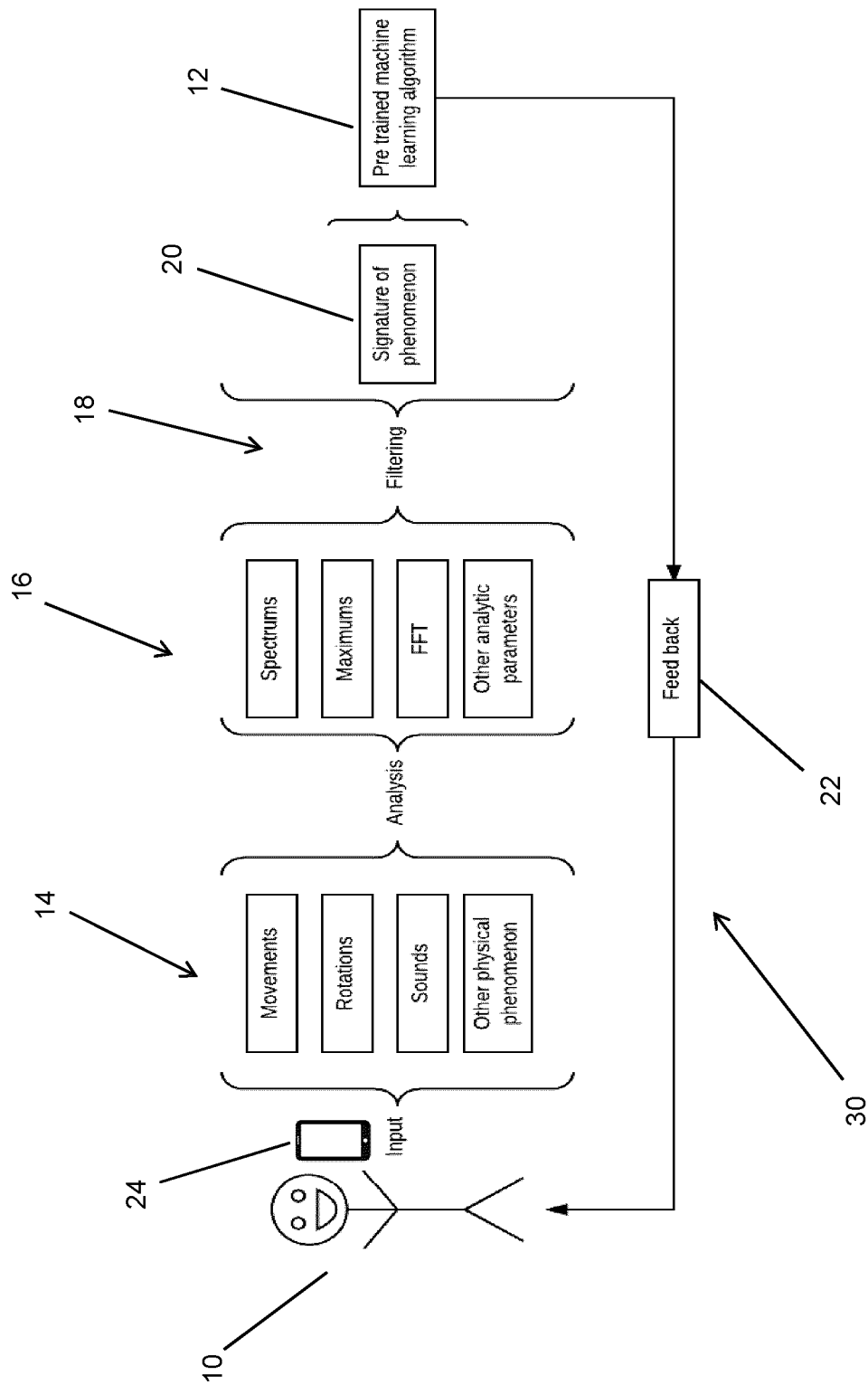
FIG. 1 is a schematic diagram showing an example of a flow of information passively from a user to an algorithm and back.

The following describes a system and methods that provides a new way to bridge the gap between a physical object (the device) and the user's intent of use for that device, without relying on active interaction modalities such as buttons and touch screens.

The system described herein uses on-going signal analysis and artificial intelligence such as multi-layer machine learning algorithms to identify the context of use for smart devices. This information can then be used to make the device "aware" of the intended user behavior to react more efficiently, thus creating a seamless user experience.

This system recognizes a way to gather time windows of sensor data, filter relevant information, classify real-life contexts and make the results available to be used in mobile devices. To address the static 2D-screen information/past behaviour problem mentioned above, the system can leverage already present sensors like accelerometers, magnetometers, gyroscopes, microphones, speakers, proximity sensors, near field communication (NFC) capabilities, barometers, ambient light sensors, etc.; to "capture" time window "signatures" of human behaviours. This allows the system to classify these time windows according to known mesoscopic human contexts or phenomena such as posture, means of transport, type of physical movement, jitters, engagement, etc. These contexts or phenomena can then be analysed to extract secondary insights such as the "likeliness of viewability", sedentary/athletic tendencies, age profile and other insights.

The system can also address the aforementioned fraud issue by distinguishing classical human motion from non-human bots and atypical click-farm behaviours. By flagging potentially risky profiles, the system can offer a cleaner picture of web/app traffic and ensure that the marketing/advertising material reaches receptive users instead of wasting efforts on non-human and fraudulent click-farms or bots.

The system can also address the aforementioned privacy problem by using only agnostic/non-private data points and avoid private web markers to sample slices of device data without knowing who or where the user is. This technique allows the system to sample the data without requesting consent from users, since it is not possible to correlate users with such data points. It is recognized that these data points may still be valuable to marketers/advertisers since they can correlate the produced labels with consumer personas even without knowing who the consumers are. Examples of this could include knowing the user is currently laying down, without knowing where; knowing that the user is riding in a bus without know which bus or even in which city; knowing that a user is in a position that strongly correlates with an engaged state, without knowing what he/she is doing; and so on.

The system can also address the aforementioned ubiquity problem by tracking real-life contexts in real-time, to provide environmental information to each back-end decision, thus allowing the user experience to be tailored to the current user in its context. The system can be directly connected to the on-board sensor(s) of the device, and the list of current contexts can be made available at the end-point. In this way, the system can sample the sensor(s) in a time window on the device, send the "signature" to the processing unit (e.g., either on-board or on remote servers) for processing, and then manage a returned list of labels for subsequent use/application.

The system can be implemented as a software-only technology that leverages hardware sensors already present in devices as noted above. The technology employed and provided by the system can be implemented in any device such as, but not limited to, portable computers, phones, wearables, smart devices, tablets, Internet of Things (IoT) devices, connected appliances, smart cars, smart homes with sensors and computing capabilities, etc. Such devices should have on-board processing capabilities, a network connection to enable the device to leverage remote processing capabilities, or both. The system can be used to expand current user experience (UX) technologies to allow users to interact with the above-mentioned devices in a more natural way. These new interactions replace heavy classical interactions and open the door to new functionalities.

Once the data is acquired from the sensors, signal and statistical analyses can be applied, to extract a wide variety of parameters. The extracted list of parameters forms the "signature" of a time window that is fed to a pre-trained artificial intelligence (e.g. machine learning) engine that classifies the signature within a list of predefined contexts depending on what module of this technology is active.

By using context dependent physical signatures in a time-based signal, it is possible to train artificial intelligence on the signatures to identify various subtle contexts of use. This is because, by using context dependent physical signatures in a time-based signal, it is possible to extract the correlation between parameters and the evolution of them. The parameters and their correlations are used as input to train the artificial intelligence algorithm to identify contexts. The result of the artificial intelligence classification is then tracked to influence a higher-level classifier, thus allowing the final output to refine the identification of various subtle contexts of use and transitions without active user input. It can be appreciated that in the examples described below and shown in the drawings, machine learning may be used as a specific case of artificial intelligence, without limiting any of the principles to machine learning rather than artificial intelligence more broadly.

By mapping the inputs to known clusters in a reduced meta parameter space, the advanced artificial intelligence (AI) algorithm is able to generate a meta position of the new point. By comparing this to the meta position of previous points from the same source it is possible to generate a meta path. By combining the meta path to the initial input and other meta information, such as device family, the last stage of the AI algorithm developed for this invention generates the final identification of various contexts without conscious user input.

A possible implementation of this process can include training the algorithms to validate how a user is positioned (e.g., seated/standing/laying) while holding/wearing the device, how a user generally holds/wears the device, how the user interacts with the device when device-specific features are used, how a user moves the device in the context of device-specific features, etc.

Example use case may include, without limitation:

Training a module to recognize how users move the devices when they want it to perform specific actions to replace buttons or useless interactions with the UI (e.g., open/close, send message, connect to Wi-Fi, etc.).

Training a module to be aware of the context in which users need the speaker features of a phone to seamlessly transfer from normal calls to speaker-calls without a separate input from the user.

Training a module on a wearable device to recognize the passive behavior of users to predict when and how they would want to change parameters (e.g., luminosity, volume, etc.) to display the optimal UI menu just-in-time.

Any other use-case related to passive context detection in devices such as, but not limited to, portable computers, phones, wearables, smart devices, tablets, IoT devices, gaming devices, virtual reality (VR)/augmented reality (AR) devices, connected appliances, smart cars, smart homes, smart infrastructure, etc.

The system described herein can be used directly in the field of HCIs, natural user interactions (NUIs), advertising technologies (AdTech), marketing, online markets (MarTech), insurance, video streaming, etc. The system can be implemented server side with web requests done from a web client (device) to a central one or more servers on which computation will be done, or the system can run directly on a device as a service or a software development kit (SDK) for in-app implementations. In any of these example, any one or more available sensors on the device are sampled, and the sampled data is provided to the processing unit(s)—locally, remotely, or both.

For HCIs, the system can augment user interactions with devices by understanding the context in which an interaction is made to pre-validate what machine learning model is then used, to thereby maximize the predictive power of artificial intelligence (AI). For example, if a mobile device such as smartphone is made aware that the user is laying down and/or in a bus and/or in a car, the smartphone could adjust the parameters of the user interface (UI) (e.g., screen orientation), to take into account this information.

For NUIs, the system can augment user interactions with devices by allowing the virtual user environment to actively react to real-life user environments. In this way, new layouts could be created by understanding how users are positioned in reality. The device could, for example, adjust UX parameters to adapt to the context, such as by keeping the screen orientation in a landscape mode when a user lays down on his/her side even if the classic or expected orientation would normally have been the portrait mode. In another example, the device could adjust the speakers to output a higher volume if the device is informed that the user is in a vehicle or other location with ambient noise, or conversely to lower the volume if the device is made aware that it is currently located in a public transit vehicle or another location where a lower volume would be desired or justified.

In an advertising application, the system can be used to identify the context in which the advertising container is viewed by the user. By adding this information to a bid-request, the system provides the advertisers with data that allows them to leverage contextual information such as general posture, means of transport, level of activity, level of engagement, etc.; when buying ad spots on webpages. This provides a new type of context that can greatly improve the ad placement quality and can allow advertisers to reach the desired audience at the moment when the individuals are most likely to be receptive to the advertisement.

In a marketing application, the system can be used to identify the context in which the device is used in order to consume marketing/ad materials as a function of time, to provide metrics by which marketers can evaluate the performance/reception of such materials. By providing the context generated by the system (e.g., such as means of transport, posture/position, level of engagement, etc.) as a function of time, marketers can measure quantitatively and qualitatively how the marketing tools are actually consumed by the users. The system can generate contexts at a rate of up to multiple times per second, thus identifying when users lose interest, which moments generated what changes in behaviour, which context had a better level of engagement, which context had an adverse effect, etc.

In online marketplaces the system can be used to inform a back-end of the marketplace website of the context of the user to adapt inventory accordingly. For example, this allows the marketplace to sell vehicle-related items to someone in a vehicle, and train-related items to someone in a train. The system can also be used to adapt the layout of a UI to minimize the number of steps and maximize the UX, depending on context since it is found that users laying down browse and consume content differently from users sitting down. The system can also assist with measuring the interest of users without requiring direct feedback or validation from the users themselves. For example, the system can identify increased engagement when browsing an item on a web marketplace even if the user did not actively rate or buy an item on the site. This information can be highly valuable to a web marketplace and to the service providers since they are looking for nonintrusive ways of identifying user interests. With the system in use, it is possible to identify which passive contexts correlate with what type of consumer/consumption.

In an insurance application the system can identify passive contexts that can then act as key parameters of an users behavioral signature. By comparing how passive users behave in certain contexts to other past behaviors such as laying down, riding a bus at a certain time, never holding the device, etc., the system can rapidly identify differences and estimate the probability that the current user is not the "owner" of the device, even without ever knowing the actual identity of the owner. Insurance companies using biometric apps to fix insurance rates without blood tests can leverage contextual behaviour signatures generated with this technology to flag users that cheat by making other people fill their activity quotas, mechanically shake their devices or other fraudulent tricks.

For video streaming platforms, the system allows the platform to identify, up to multiple times per second, the important human parameters of the context in which the user is viewing the content. These "continuous" measurements would augment the current analytic tools available on these platforms and would provide a new method to follow engagement in real-time instead of static display measurements that are currently used.

It can be appreciated that the above example implementations of the system could be done directly in a device such as in the operating system (OS), in a service or in an app. The system could also be deployed in a web page through web scripts.

As indicated above, various types of devices can be used in conjunction with (or host) the system. The device requires at least one on-board sensor or coupled sensor to detect when the device is in use (with various example sensors listed above). The device should also have either sufficient on-board computing power or an interface or module for communicating with an external computing unit.

For example, the implementations described herein can either by computed directly on the device using a local processing unit, or remotely through a cloud or network platform, or a combination of both.

Turning now to the figures, FIG. 1 illustrates an example showing the flow of information passively from a user 10 to an algorithm 12 and back for subsequent use. In this example, when using the device, the user 10 passively supplies various inputs 14, such as movements, rotations, sounds, or other physical phenomena. These passive inputs 14 can be collected and analyzed in an analysis stage 16. These analyses 16 can be done by applying spectrums, maximums, FFTs, and other analytic parameters. The results of the analyses are then filtered in a filtering stage 18 to determine a signature 20 of the phenomenon that has been analyzed. The signature 20 is then fed into a pre-trained algorithm 12 and classified, and the device 24 of the user receives the results to react accordingly. For example, reacting accordingly can include an action for the user 10, a UI response provided by the device 24, a haptic response delivered through/by the device 24, or any other interaction or feedback with the user 10 that the OS of the device 24 can perform. The presently described technology can therefore provide information on the context of the interaction, and such context can be used in any application-specific scenario. It can be appreciated that in order to perform optimally, the algorithm should already be optimized based on pre-gathered data from trainers. For example, it is found that there is a minimum amount of statistics needed to be achieved, but the fact that the number of contexts may be limited to a predefined list makes this less dependent on massive data sets. That is, the approach described herein does not require that all the users in the world (or a massive set of users) train the algorithm(s). However, the more data that is obtained, the better, such that the system 30 can refine training as more people use it but that is not required with this technology.

The system 30 described herein can sample non-private physical sensors to associate the data with pre-gathered high quality labeled datasets obtained by the system 30 (e.g., see the clustered and labeled datasets in FIGS. 11 and 12), to identify which pre-trained AI-module is best suited to generate the label that identifies which real-life scenario generated the data in the first place. The real-life scenario the system covers focuses primarily on passive actions that give information on how users 10 interact with devices 24 at the unconscious level such as their level of attention, posture, handedness, age, etc.

Figure 2:
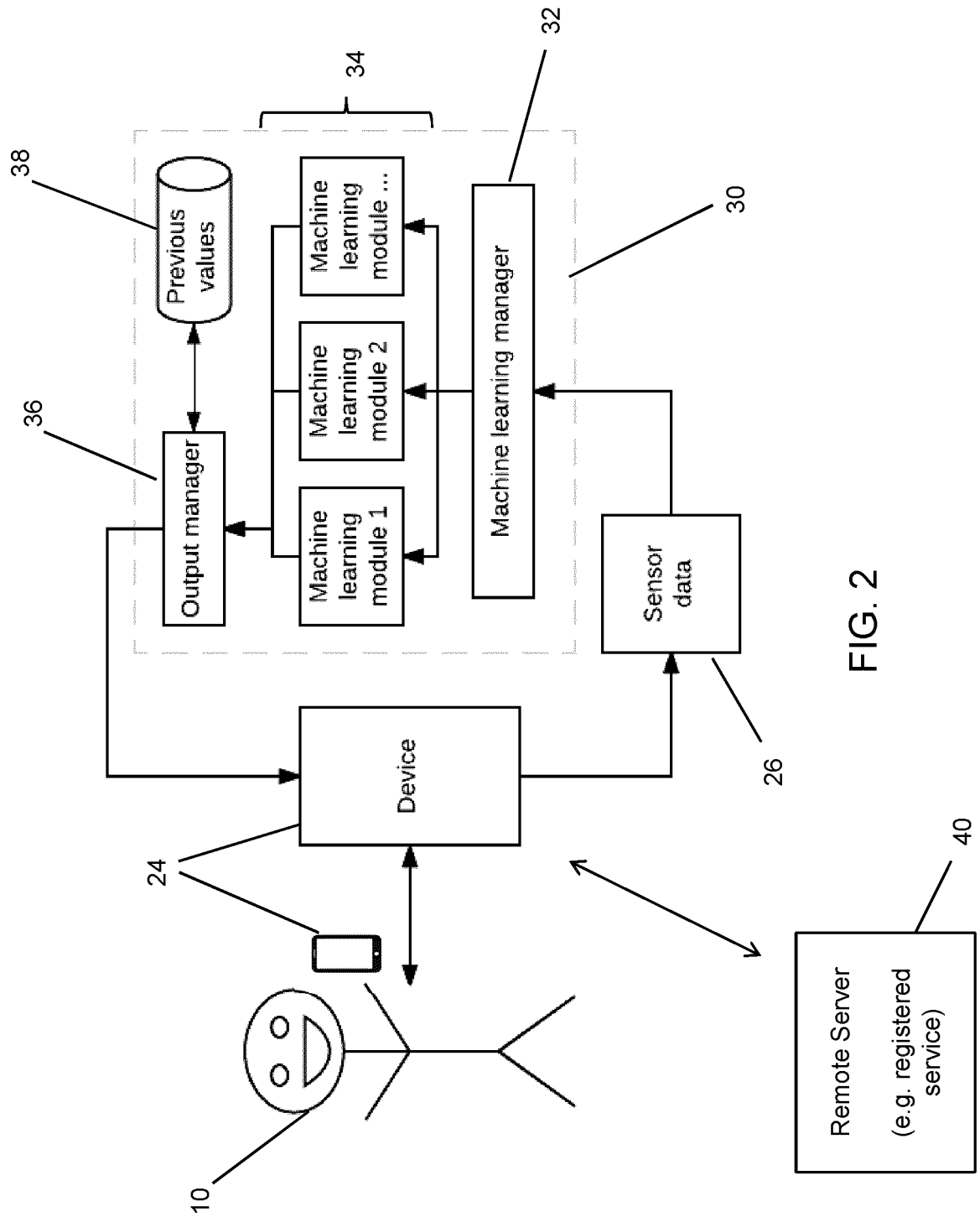
FIG. 2 is a schematic diagram shown an example of a system for classifying passive human-device interactions through ongoing device context awareness.
Figure 3:
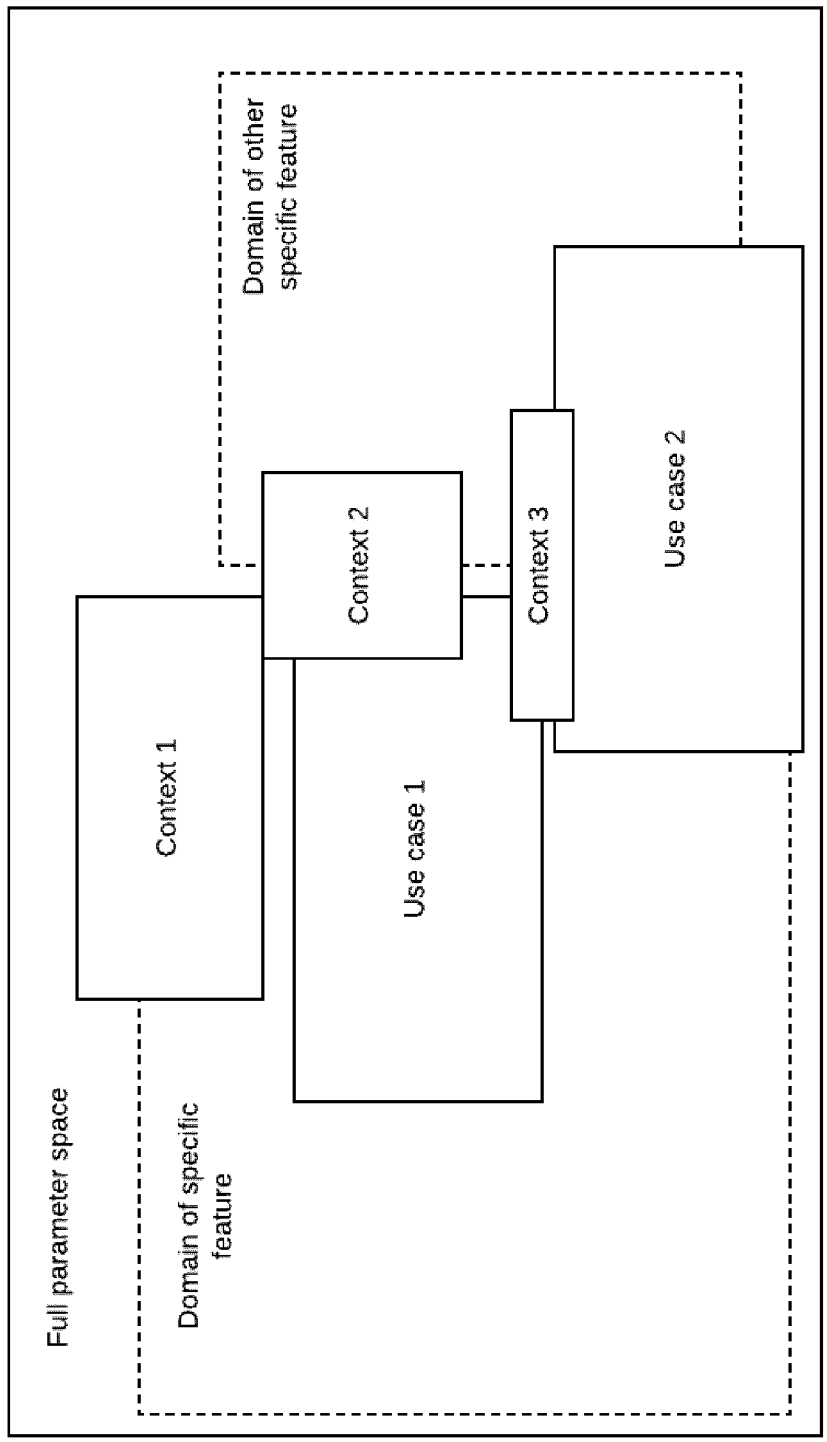
FIG. 3 is a graphical representation of a parameter space with sub domains for contexts and potential use cases.

It may be noted that FIG. 3 illustrates the "shape" of the full parameter space in which data points exist. This parameter space is generated and populated with the pre-gathered data (and since the system 30 wants the best quality the system 30 curates it). Each new set or sample of data is compared to this data mapping to identify which pre-trained AI-module 34 should be used. As such, FIG. 3 can be considered a sub-step of the machine learning manager 32 in FIG. 2, which is in turn in charge of managing the step between items 20 and 12 illustrated in FIG. 1.

It may also be noted that a label for the context of AI is a series of human-readable words or phrases that describe the data. In this specific case the labels are the potential states that describe how a human trainer generated the data. A list such as this one could be attached to a data point: [standing, engaged, in left hand, walking, 35 years old, female, browsing web, motorola phone, firefox browser]. Each of the 9 elements of this list would be a different label.

It should also be noted that the system 30 provides an ability to identify "passive contexts" for ubiquitous NUIs, both in apps and in-browser. "Passive contexts" include but are not limited to:

Is the user in a position that is engaged with the device or not engaged?
Is the user a human, bot or click-farm?
Is the user standing, seated or laying down?
Is the user in a car, bus, train, plane or on foot?
Is the user old or young?
Is the user right handed or left handed?
Does the user have big hands or small hands?
Does the user have a strong grip or weak grip?
Does the user shake/tremble?
Does the user's current behaviour consistent with past behaviour?

As such, the system 30 is configured to leverage "on-the-fly" clusters and new data from sensors to identify which AI-module is the best to label the incoming new data point. The system 30 can also leverage both recent labels (past) and new data points (present) to identify which "passive context" generated the new data and how confident the system 30 can be with this label. A cluster is a group of points of data that share either similar meta parameters or, more classically, share a close proximity in 3D space or meta parameter space as it is often the case in AI. In this case the system 30 can leverage clustering to group data by known labels or family of labels. By this concept if a new data point, under the same transformation to the meta parameter space, is close to a known cluster there is a higher probability that it has the same label or that it has a label from the cluster's family of labels. In the case of a cluster composed of a family of labels, it is associated with a specific AI algorithm that is specially trained to classify within its family of labels.

FIG. 2 illustrates a block diagram showing a device 24 being interacted with by a user 10. The device 24 has or is coupled to one or more sensors that generate sensor data 26. The device 24 is connected to a number a machine learning modules 34 through a machine learning manager 32 that is responsible for connecting the proper sensor data 26 to the proper AI module 34. Each module 34 utilizes a combination of sensors, and signal/statistical tools to generate the signature 20 from the data specifically for its function/application. An output manager 36 receives each individual output and generates a final output based on an analysis of new values, previous values 38 stored or otherwise available, and active modules for the device 24. The device 24 includes a CPU and/or other hardware on which the presently described technology operates.

It can be appreciated that the system 30 is configured to interact with physical sensors, but operates as a virtual sensor. The process flow of the system 30 can be summarized as follows: sampling→pre-analysis→relative analysis-→classification→confidence analysis→reporting/outputting.

The system 30 samples physical sensors on the device 24 in a time series, referred to herein as "rawDataVector", either continuously or based on certain triggers. Sensors can include, for example, accelerometers, gyroscopes, linear accelerometers, magnetometers, light sensors, speakers, microphones, etc. Triggers can include, for example, threshold crossings on certain sensors, time based triggers, event based triggers, etc. Metadata can also be added and included with a family of device model, device shape, screen shape, hardware specs, etc. It can be appreciated that the expression "family of device model" is used in this context as a "group of devices that the system 30 has identified as similar enough to generate physical signature that can be classified in the same way by a AI algorithm". An example of this could be all models of a particular brand of smart phone are in the same family. Additionally, all of a particular model of phone, whatever the sub-serial number, can be put in the same family. Sampling is done through, for example, browser scripts, browser plugins, SDKs/libraries, etc. In the case that a rawDataVector was already analyzed from a specific user 10, the previous labels and meta location generated in the process can also be attached to the rawDataVector.

Each sampled rawDataVector is sent to be processed in order to generate a list of statistically relevant parameters referred to herein as "statDataVector". Statistical parameters can include, for example, the maximum of each sensor axis, the minimum of each sensor axis, a standard deviation of each axis, a fast Fourier transform (FFT) of each axis, a power spectrum of each sensor, etc.

It can be appreciated that, as discussed above, the processing performed by the system 30 can be done on-board the device 24 or remotely by sending data to a server or cloud service that is accessible via a network or other communication connection.

Each statDataVector can be compared to known data clusters generated on previously curated and labeled statDataVector sets to generate a relative positioning in the labeled cluster subspace. This location in the cluster subspace is referred to herein as a "metaLocation". This metaLocation can be based on any linear combination of elements in the statDataVector, rawDataVector or metadata. The metaLocation defines which list of classifiers will best describe the underlying real-life contexts that was happening at the moment the rawDataVector was sampled. The metaLocation generated can also be compared to previously generated metaLocations, in the case of continuous measurement, and the "metaPath" followed at each metaLocation by each sequential statDataVector is analysed. The list of parameters defining this metaPath can also be taken into consideration for the next step with the list of classifiers.

The list of classifier defined for each metaLocation is composed of pre-trained AI modules 34 that can include for example posture, means-of-transport, level-of-activity, engagement, age-profile, jitter, etc. Each pre-trained AI module 34 is generated by supervised machine learning to classify a single statDataVector+metadata+metaLocation+metaPath. The architecture of each AI module 34 can be for example support vector machines (SVMs—linear or other), neural networks (NNs), dynamic neural networks (dNNs), convolution neural networks (cNNs), generative adversarial networks (GANs), etc. Each AI module 34 can be configured to be focused on a specific real-life question that can include, for example:

Is the user in a position that is engaged with the device or not engaged?
Is the user a human, bot or click-farm?
Is the user standing, seated or laying down?
Is the user in a car, bus, train, plane or on foot?
Is the user old or young?
Is the user right handed or left handed?
Does the user have big hands or small hands?
Does the user have a strong grip or weak grip?
Does the user shake/tremble?
Does the user's current behaviour consistent with past behaviour?", etc.

Each pre-trained AI module 34 produces a label and a level of probability. The label is compared to the average label produced by this AI module 34 at its metaLocation in the cluster subspace previously computed. A weighted sum of the probability and the deviation between the label and the expected metaLocation average label produces the level of confidence. The label, the probability and level of confidence for each AI module is then concatenated as a "stateVector" that is sent back to the specific device that generated the initial rawDataVector. If the computing is done on-device 24, the stateVector is shared with registered services. If the computing is done remotely, the stateVector is sent via the network or communication connection, and then shared with a registered service, e.g. in a remote server 40.

A copy of the stateVector should be kept on the device 24 to be sent with the next rawDataVector for reference or for local request if needed.

There are various configurations for the system 10 that can be employed. For example, an in-browser configuration can use a Javascript plugin that samples the sensors directly through, for example, HTML 5 and sends raw data to be analysed in a remote server 40.

For an in-app configuration the system 30 can use mobile rich media ad interface definitions (MRAID) containers. For this configuration, a Javascript plugin can be used that works like in web browsers but with a thin software layer as an application programming interface (AP)I.

For an SDK configuration (e.g., app, OS or on-board), the system 30 can use a library built-in for an app or in an OS as a service to directly tap into the sensors. In this implementation, the computing can be done directly on-board or through server calls depending on how much the device's CPU can compute (e.g., a smart phone can compute more than simple printed boards).

For a platform as a service configuration, the system 30 can be made to be completely cloud-based and sample remote sensors as an integration solution with a host of disconnect sensors, such as IoT set-ups or smart homes. In this implementation a central computing unit (e.g., on the remote server 40) could gather all the sensor data and then send it to the cloud for computing, similar to the in-browser implementation mentioned above.

FIG. 3 illustrates a conceptual representation of a parameter space with a subdomain for each context, use case and Domain. Each new data point can be mapped to this full parameter space to identify within what conceptual subdomain it falls under, thus defining what series AI modules are best suited to classify it's contexts. How each new data points relates to past points in this parameter space also allows this technology to more efficiently refine classification. The fractal nature of this parameter space can also be leveraged at a smaller scale within subdomains.

Contexts represent how users move/interact with the device. Use cases represent what users want the device to do or what they want to do with the device. Domains represent conceptual sub-spaces within the parameter space that have distinct population of either contexts or use cases. Overlap of a use case and a context represent the sub-set of parameters where actions related to that use case should take place when the context is identified. Overlap between contexts and use cases cause confusion and are to be avoided through the break-down of the parameter space in sub-domains. The distinction between these 3 concepts within the parameters space allows the system 30 to refine the list of elements in the signature 20 fed to the machine learning module 34 to decrease latency and increase accuracy. This combination of topology and machine learning allows the system 30 to leverage the "motion" within the parameter space as a feature in a multi-level algorithm to track and predict subtle changes in passive interactions with higher accuracy than current methods.

Figures 4A, 4B:
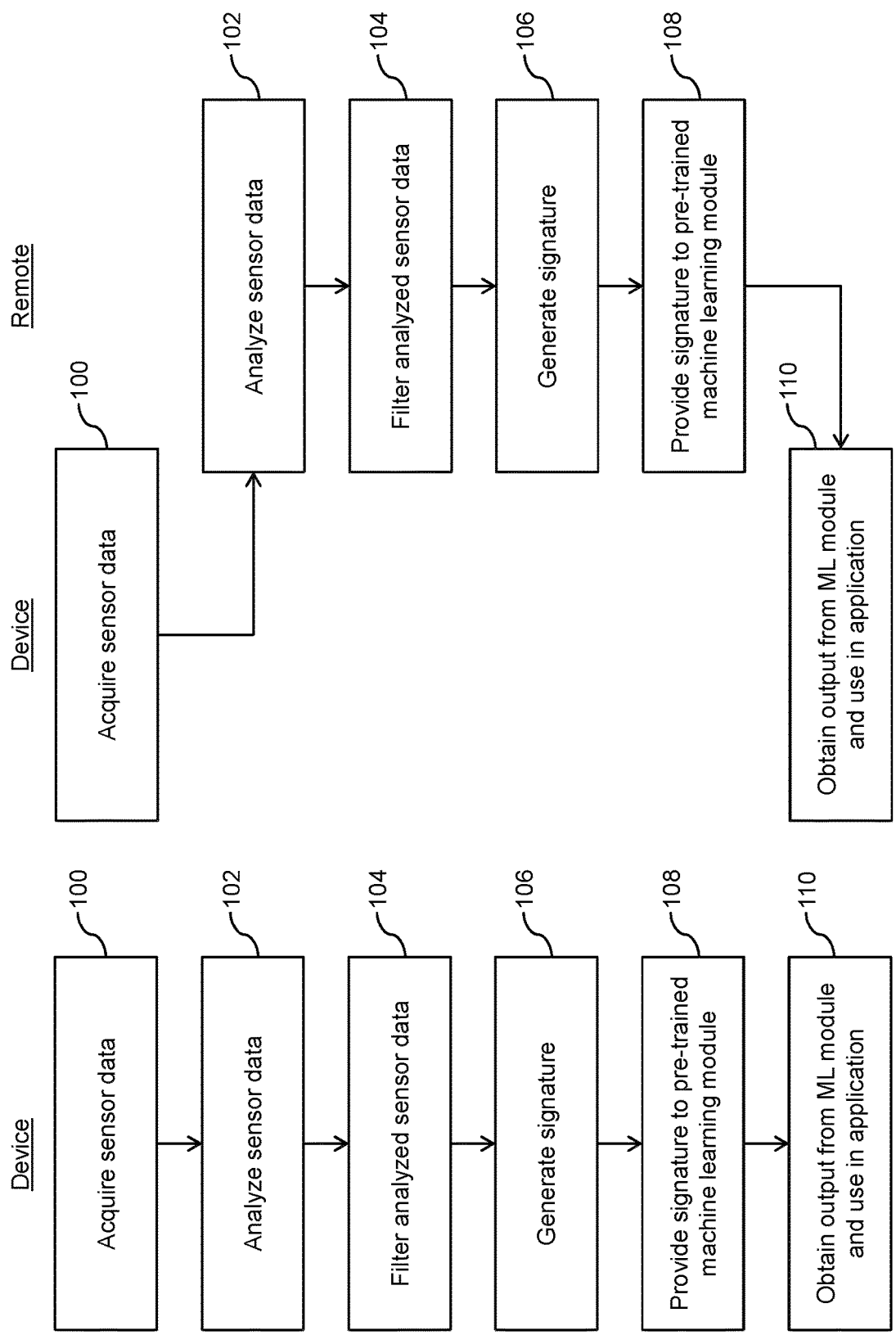
FIGS. 4(a) and 4(b) are flow charts illustrating steps performed in classifying passive human-device interactions through ongoing device context awareness.

FIGS. 4(a) and 4(b) provide flow charts illustrating steps performed by a mobile device 24 and using a remote processing entity such as the remote server 40 respectively, to classify passive human-device interactions through ongoing device context awareness. In this example, the processes include acquiring sensor data 26 at step 100, and analyzing the sensor data 26 at step 102, e.g., in the analysis stage 16 shown in FIG. 1. Next, the analyzed sensor data may be filtered at step 104 (e.g., at the filtering stage 18 shown in FIG. 1), and this enables the system 10 to generate the signature 20 at step 106. The signature 20 is then provided to a pre-trained AI module 34 at step 108 and the module 34 executes one or more machine learning algorithms to generate an output at step 110. The output at step 110 contains the most likely labels as produced by the AI modules 34 and the level of confidence in labels. The level of confidence is computed with the weighted probability of the AI output and the distance to the most likely state estimated from the motion of the user in the parameter space's topology. In FIG. 4(a) it is assumed that all operations are performed on the device 24, and in FIG. 4(b), it is assumed that all processing/analysis operations are performed remotely. However, it can be appreciated that other divisions of duties can be used. For example, the device 24 may be used to acquire, analyze and filter the data, while the remote entity 40 generates the signature 20 and applies the machine learning. In any such configuration, so long as the sensor data is acquired and an output is provided back to the device 24, the context awareness can be determined and leveraged by use in an application or functionality on the device 24.

Figure 5:
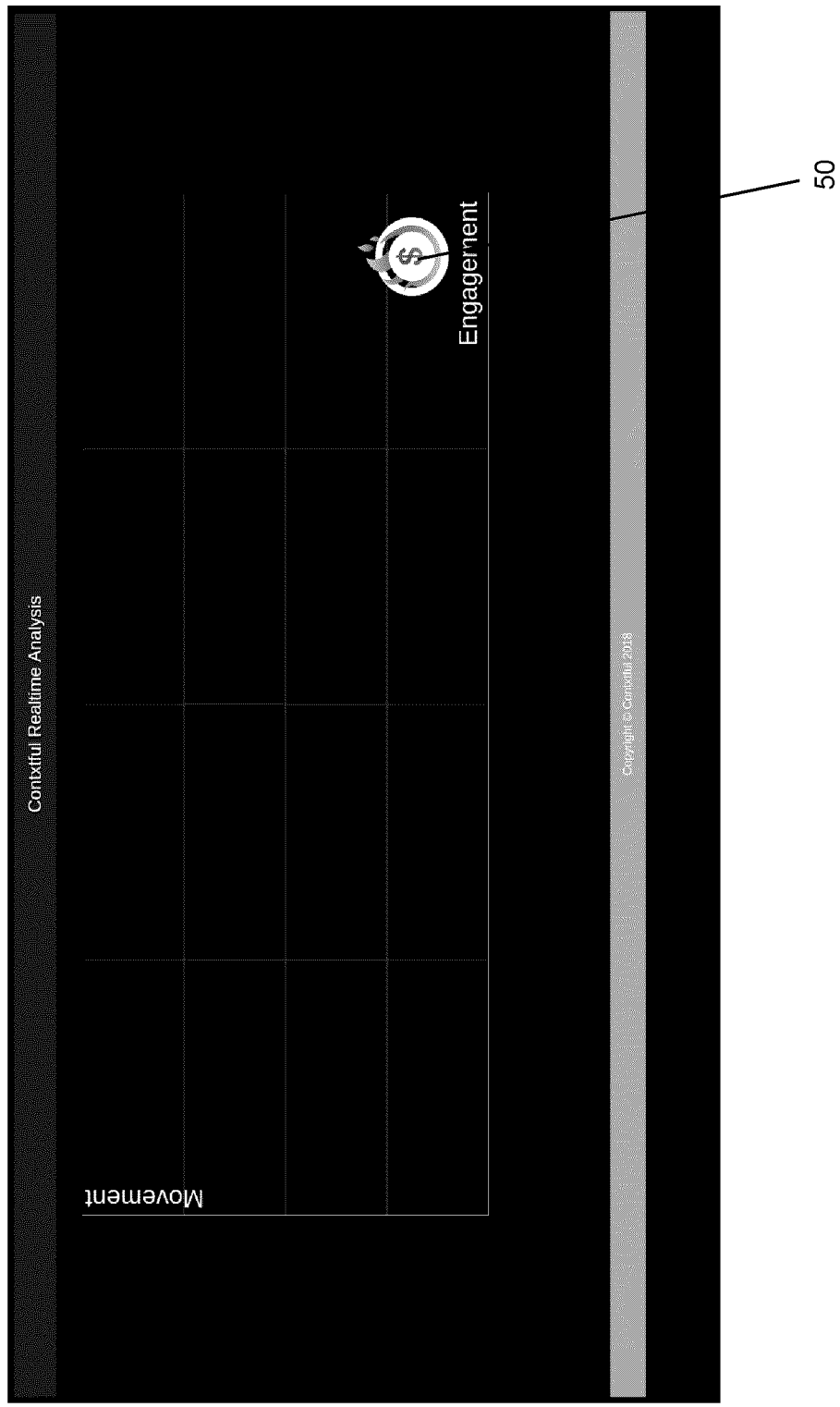
FIG. 5 is a screen shot of a demonstration of a potential visualization of a real-time context analysis.

FIG. 5 provides a screen shot of a real-time analysis of user engagement. As a user 10 engages and interacts with a web page, the system 30 labels the interactions as "engaged"/"not engaged" and measures the level of activity. The system 30 in this example then displays engagement on a secondary screen as a moving icon 50. The screen shot in FIG. 5 includes the secondary screen and shows the viewer's state.

FIGS. 6 through 12 include various graphs that represent how the system 30 can separate a web page's audience and follow the evolution of their browsing behaviours. These graphs also show how the generated passive context can correlate to key parameters such as how much marketing content is consumed as a function of the generated filters. FIGS. 6 through 8 illustrate traffic as a function of time comparing standard statistics (labeled "No Filter") with each label generated by the system 30. In each graphic, r represents the average time in seconds spent on the domain by each unique user in a day. Users holding the devices in-hand or sitting users tend to remain the longest in the domain. In all cases, it can be observed that the No Filter case fails to capture the effects on traffic as behaviours average out. An increased time spent on website correlates with an increase consumption in the product, It both increases the profitability of the marketing assets and the likelihood of advertising conversion.

Figures 6A, 6B, 6C:
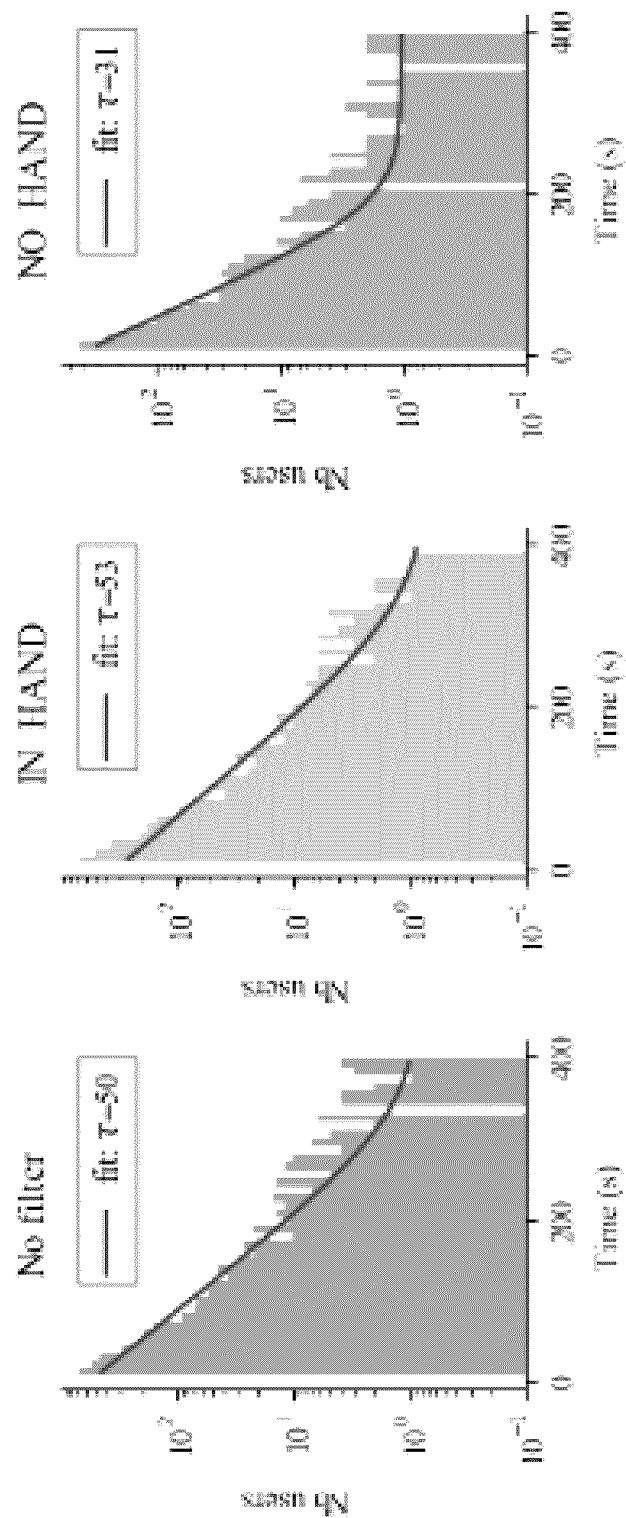
FIGS. 6(a) to 6(c) are graphs depicting the effect of device holding habits of users on traffic as a function of time spent on domain during a visit.

Referring first to FIGS. 6(a) through 6(c), these graphs depict the effect of device holding habits of users on traffic as a function of time spent on domain per visit on a test website. It may be observed that users holding the device spend an average of 40% more time on the domain per day.

Figures 7A, 7B, 7C:
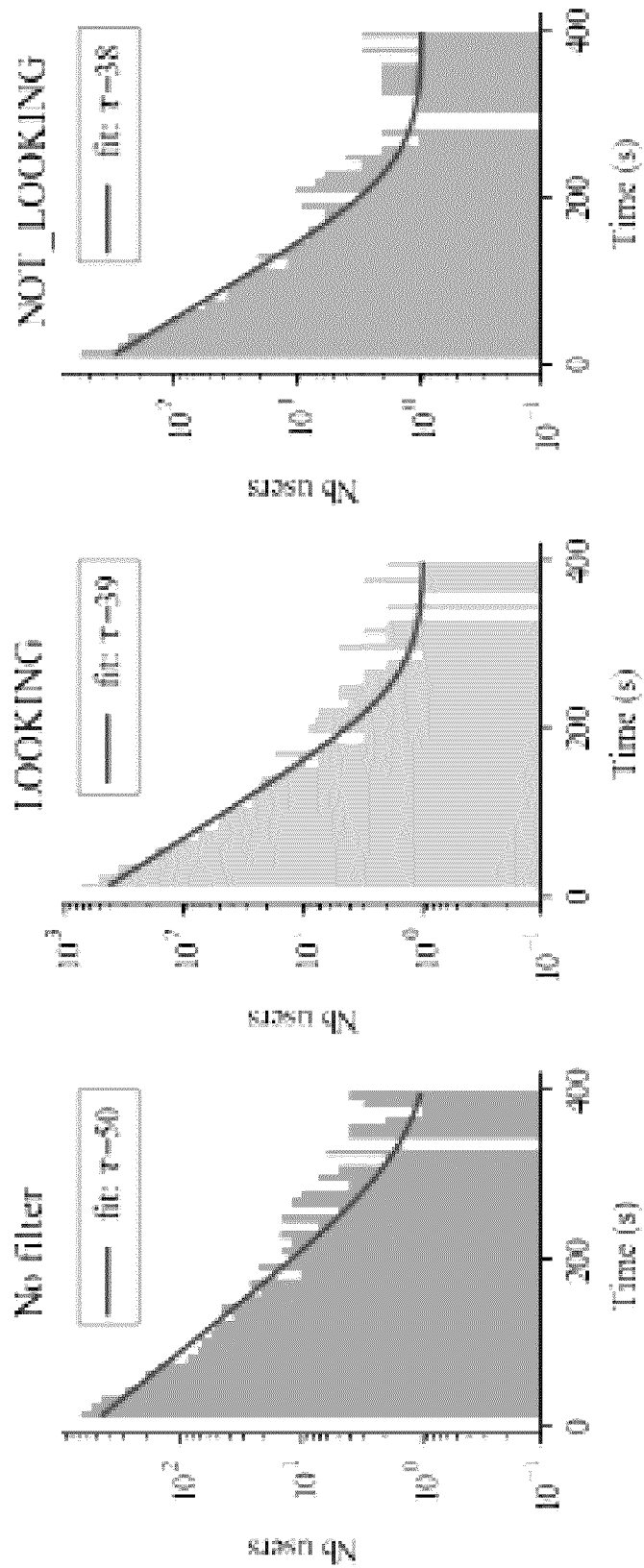
FIGS. 7(a) to 7(c) are graphs depicting the effect of level of engagement of users on traffic as a function of times spent on domain during a visit.

FIGS. 7(a) through 7(c) are graphs depicting the effect of level of engagement of users on traffic as a function of times spent on domain per visit. It may be observed that engagement does not appear to have a significant effect on the time spent in the domain as both the pool of users spend on average 40 seconds on the domain.

Figures 8A, 8B, 8C:
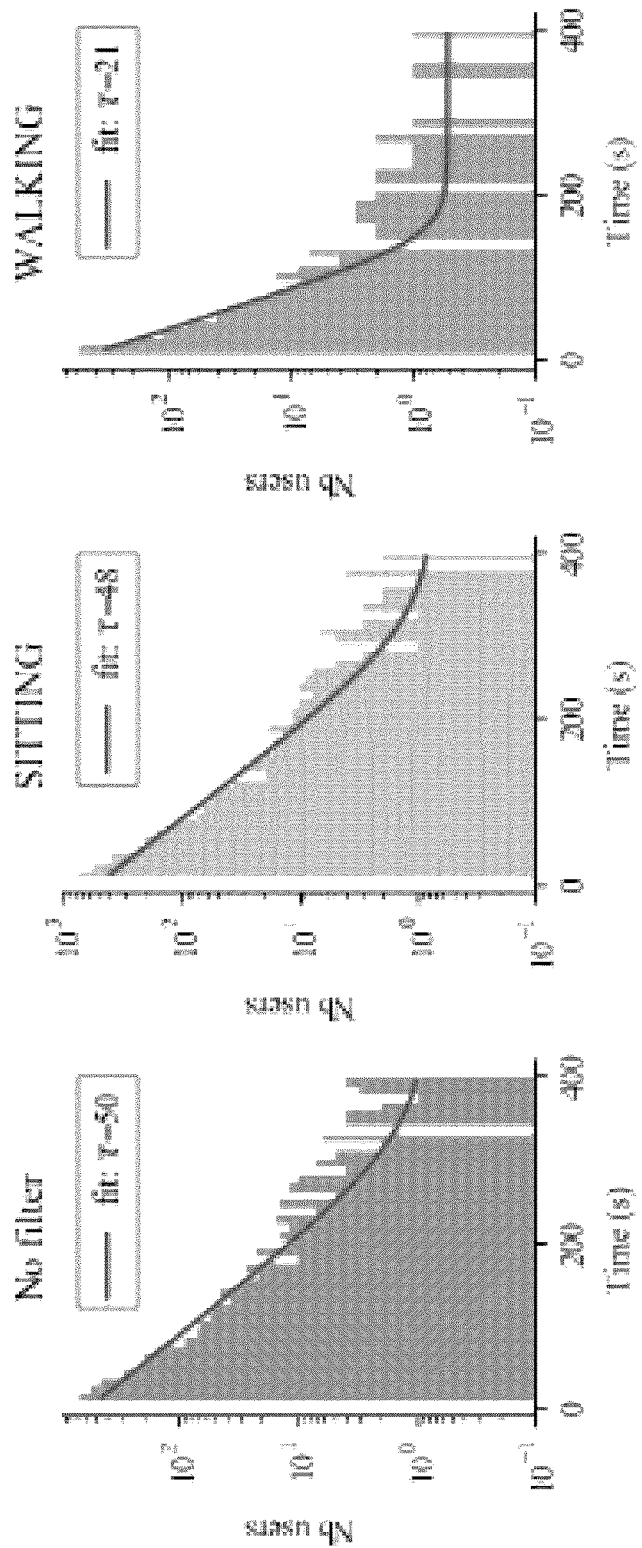
FIGS. 8(a) to 8(c) are graphs depicting the effect of level of activity on traffic as a function of time spent on domain during a visit.

FIGS. 8(a) through 8(c) are graphs depicting the effect of level of activity on traffic as a function of time spent on domain per visit. It may be observed that sitting users remain more than twice as long on the domain as users "on-the-go". Moving users appear to display a cut-off after 5 minutes while sitting users stay on the domain well beyond the 8 minute mark.

Figure 9A:
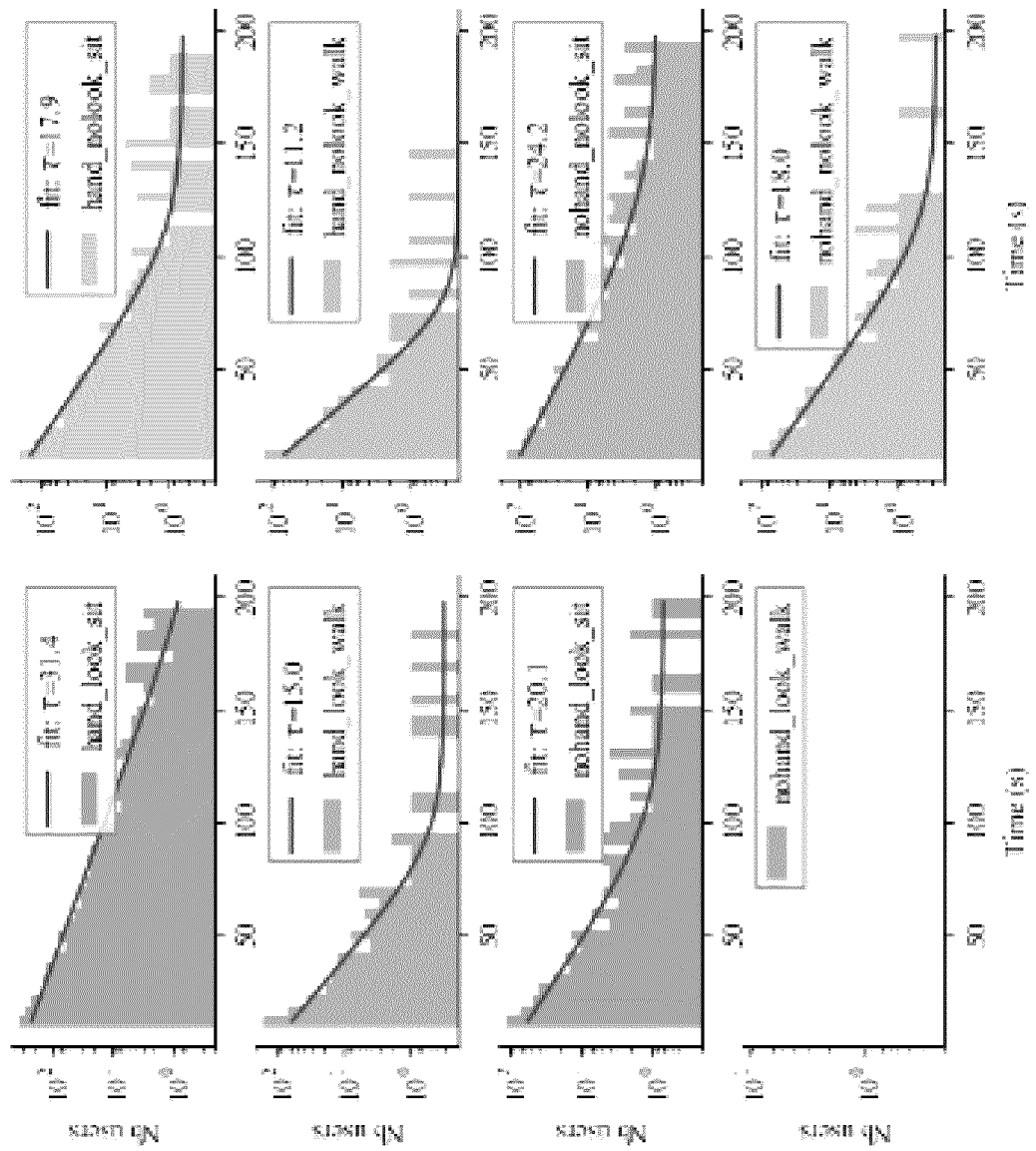
FIG. 9(a) provides a series of graphs depicting user distribution as a function of time spent on domain for each state created by a triplet of labels.
Figure 9B:
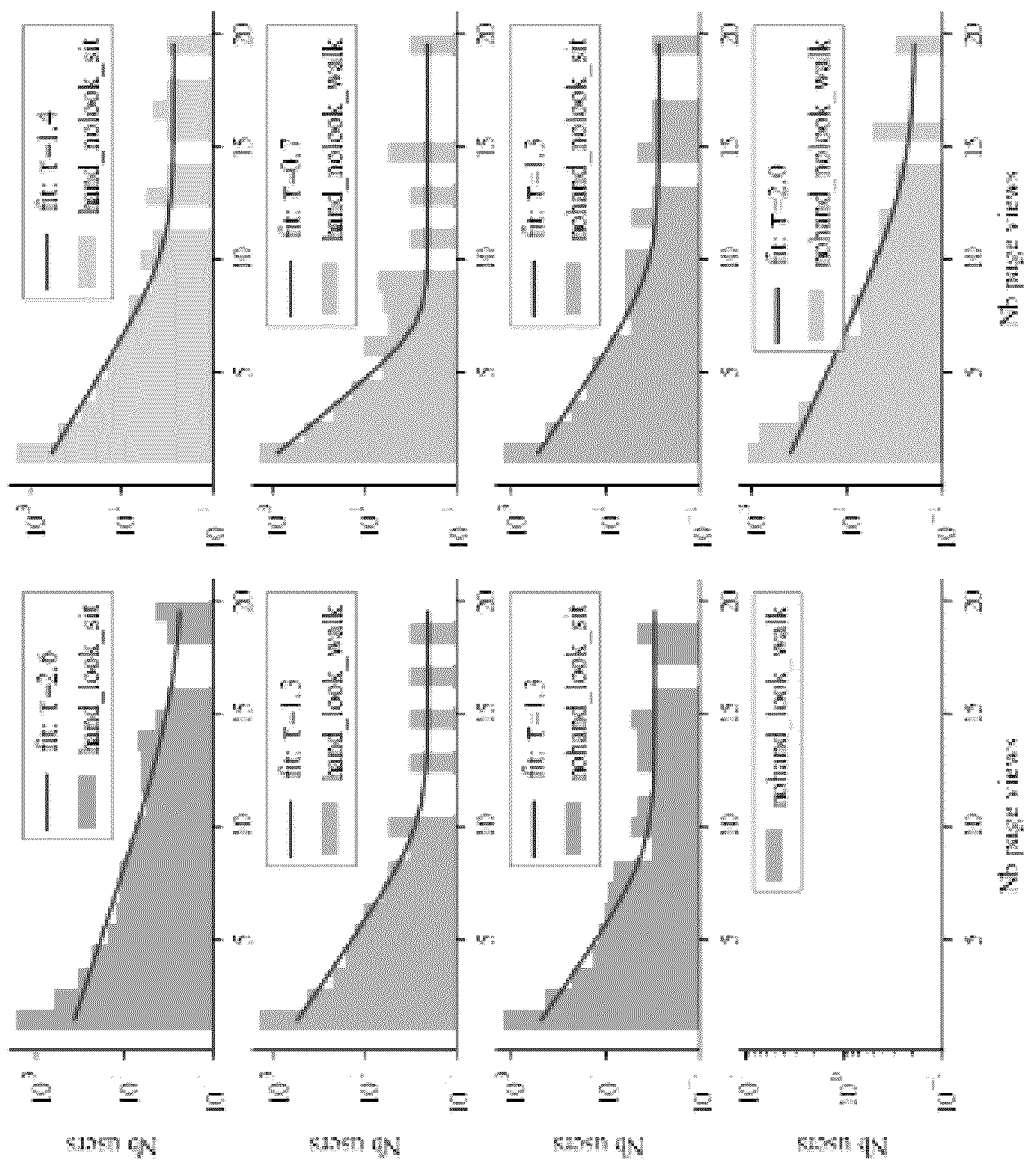
FIG. 9(b) provides a series of graphs depicting user distribution as a function of the number of pages viewed for each state created by a triplet of labels.

FIGS. 9(a) and 9(b) illustrate the effect of a triplet of labels on viewing parameters. The triplets are combinations of how the user holds their device (hand vs. non-hand), how involved they are in viewing the content (look vs. no-look), and how active they are (walk vs. sit). For instance, it is considered to be impossible to view a phone while walking if the phone is not in the user's hand or otherwise supported by some external mounting device. Referring first to FIG. 9(a), these graphs show the time spent on domain for each state created by the triplet of labels. All graphs on the left-hand side display behaviour when users actively look at their devices while graphs on the right-hand side display behaviour of users not actively engaged with content. Each horizontal pair (look vs. no-look) show a clear difference of behaviour with a dramatic difference favouring look when the user is holding the device (top two lines). The impact of engagement is less pronounced and inverted when users are not holding the devices in their hands.

Referring next to FIG. 9(b), the number of pages viewed for each state created by a triplet of labels is shown. All graphs on the left-hand side display behaviour when users actively look at their devices while graphs on the right-hand side display behaviour of users not actively engaged with content. The differences between each horizontal pair (look vs. no-look) is not as dramatic as in FIG. 9(a), but an increase in average page viewed in favour of the look label can still be seen when users are holding their devices (top two lines). The impact of engagement is not present when users are not holding the devices in their hands.

Figure 10:
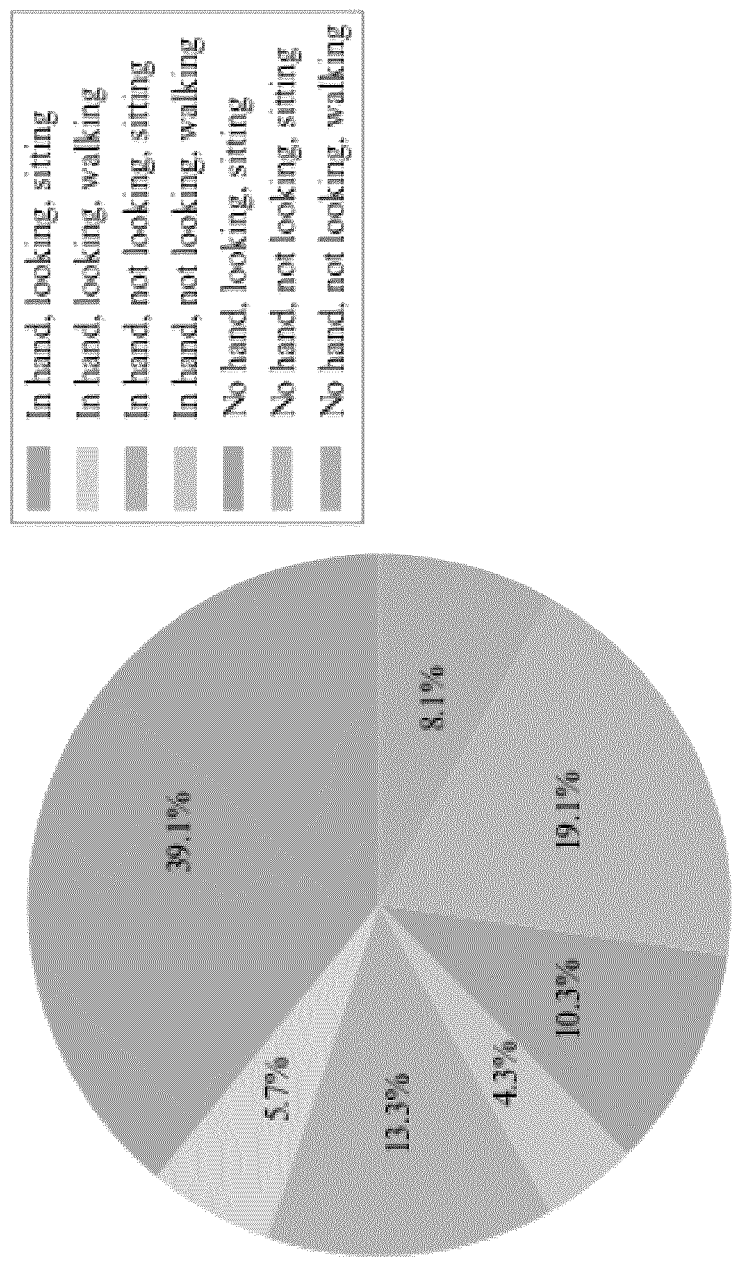
FIG. 10 is pie chart depicting the distribution of traffic on a specific website as a function of three combined labels.

FIG. 10 provides a pie chart depicting the distribution of traffic as a function of three combined labels, namely whether or not the device 24 is in the user's hand, whether or not the user 10 is looking at the device 24, and whether the user 10 is sitting or walking. In this graph it can be seen that: 39.1% of traffic occurs when users 10 are sitting, looking at their devices, while in-hand; 5.7% of traffic occurs when users 10 are walking, looking at their devices, while in-hand; 13.3% of traffic occurs when users 10 are sitting, not looking at their devices, while in-hand; 4.3% of traffic occurs when users 10 are walking, not looking at their devices, while in-hand; 10.3% of traffic occurs when users 10 are sitting, looking at their devices, while not in-hand; 19.1% of traffic occurs when users 10 are sitting, not looking at their devices, while not in-hand; and 8.1% of traffic occurs when users 10 are walking, not looking at their devices, and while not in-hand. Coupled with FIG. 9(a) it can be seen that profiles with a higher average number of page viewed (in hand/seated/looking and in hand/walking/looking) occupy less than 45% of the traffic but account for close to 70% of average time spent on the domain.

Figure 11:
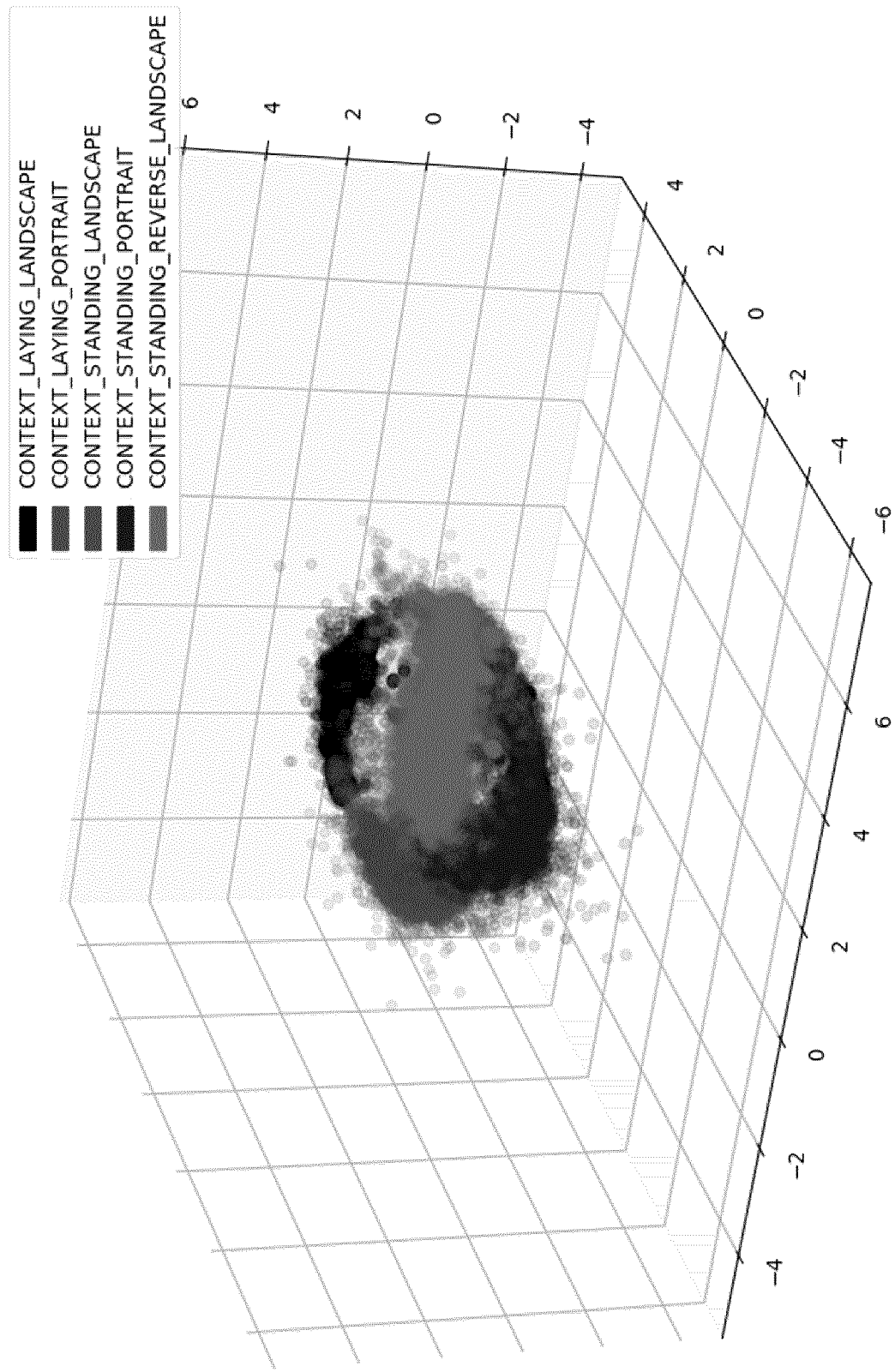
FIG. 11 is an example of a distinguishable 3D cloud of clustered points from the contextual data generated by standing and laying users in a meta parameter space.
Figure 12:
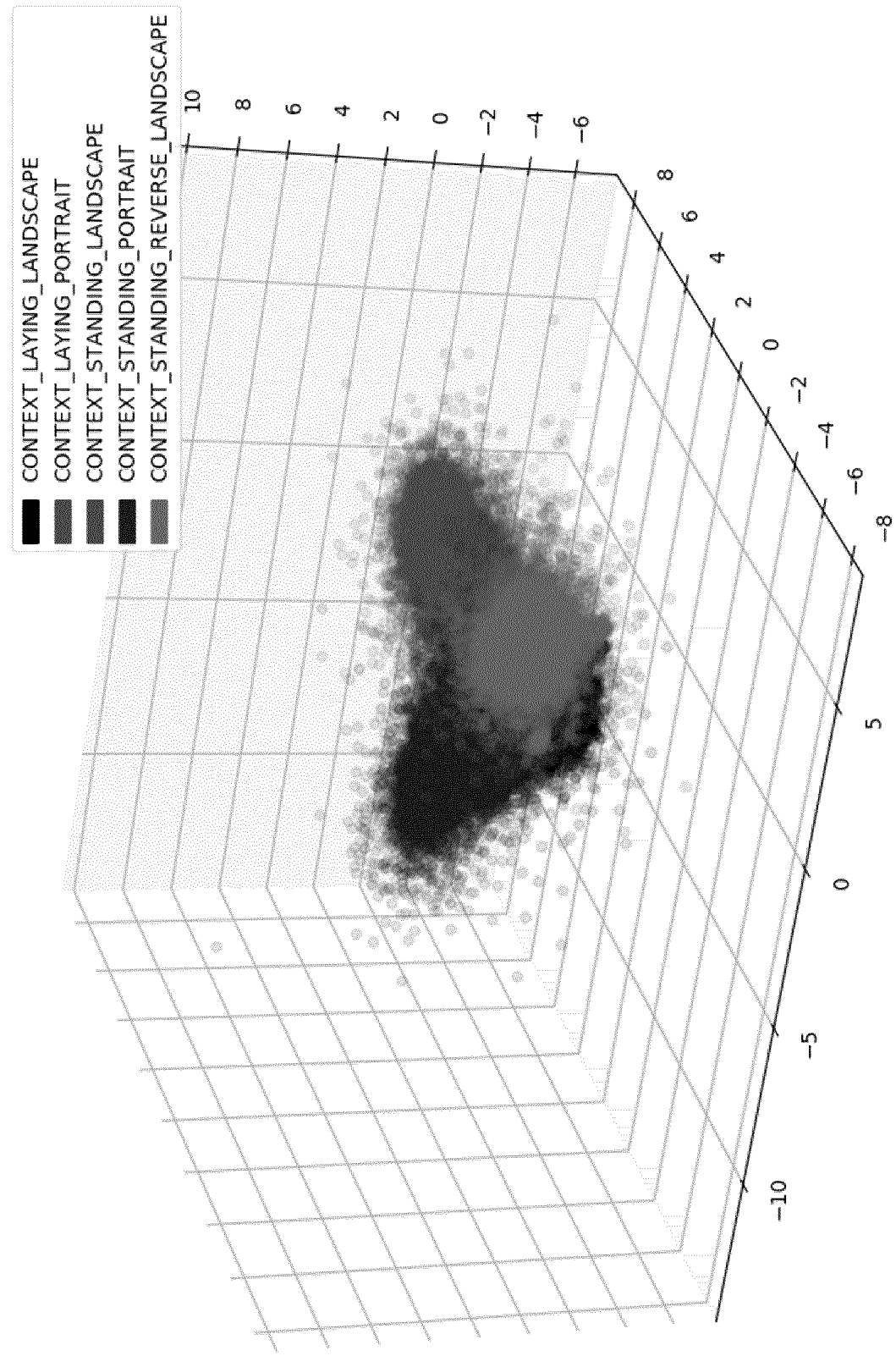
FIG. 12 is an example of a distinguishable 3D cloud of clustered points from the contextual data generated by standing and laying users in a maximum-spread meta parameter space 3D view of raw data for example traffic.

FIGS. 11 and 12 provide 3D graphs showing raw data, namely data points for the user laying down while in landscape mode, laying down while in portrait mode, standing while in landscape mode, standing while in portrait mode, and standing with "reverse" landscape. The data shown in both FIGS. 11 and 12 are interesting because they show how the data associated with each label is distinguishable even by a human. These graphs are a visual background to the explanation above, explaining the motion within the parameter space. FIGS. 11 and 12 are examples of this parameter space and any new data point could be mapped into this parameter space. The closest it would be to one of the clusters the more likely it would be to have of the same label as the point in the cluster. FIG. 11 shows one representation of the data set containing the standing/laying data while FIG. 12 shows another. Both are equivalent conceptually but can be used by choice. FIG. 11 shows the one that would be the best in the case of trying to understand how motion occurs between multiple states, while FIG. 12 may be more useful for brute force classification without considering historical motion in the parameter space.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device, any component of or related to the device, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method of classifying passive interactions with a device, comprising:
    obtaining one or more passive inputs from one or more sensors on or coupled to the device, the one or more passive inputs being representative of a passive behaviour of a user relative to the device and being received from a time-based signal;
    analyzing the passive inputs using one or more algorithms to extract a list of parameters of a time window and generating a signature of the time window for a phenomenon associated with the passive inputs, generation of the signature including extracting a correlation among the parameters and an evolution of the parameters from the time-based signal; and
    applying the signature to a pre-trained artificial intelligence algorithm identifying a passive context of use therefrom, to generate an output indicative of the passive context of use and being transmitted to the device for use in an application or functionality on the device.

2. The method of claim 1, further comprising having the device react to the output indicative of the passive context of use, for providing a seamless user experience.

3. The method of claim 1, wherein the pre-trained artificial intelligence algorithm generates one or more labels for data.

4. The method of claim 3, further comprising saving the one or more labels for subsequent analyses.

5. The method of claim 1, wherein the pre-trained artificial intelligence algorithm corresponds to one of a plurality of machine learning modules, the method comprising selecting one of the plurality of machine learning modules according to which module is best suited for a scenario associated with the passive inputs.

6. The method of claim 1, wherein at least one processing step is performed by sending data to a remote server, and receiving results from the remote server, and/or sending the results to another destination.

7. The method of claim 1, wherein the one or more passive inputs are obtained from pre-existing sensors on or coupled to the device, including at least one of an accelerometer, magnetometer, gyroscope, microphone, speaker, proximity sensor, near field communication (NFC) capability, barometer, or ambient light sensor.

8. The method of claim 1, wherein the device corresponds to one of a portable computer, phone, wearable device, smart device, tablet computer, IoT device, gaming device, virtual reality (VR)/augmented reality (AR) device, connected appliance, smart car, smart home, or smart infrastructure device.

9. The method of claim 1, wherein the passive inputs are obtained by sampling at least one physical sensor in a time series, processing sampled data to generate a list of statistically relevant parameters, comparing the list to known data clusters generated on previously labeled data to generate a relative positioning in a labeled cluster space, and defining a list of classifiers that best describes underlying contexts occurring when the data was sampled.

10. The method of claim 9, further comprising incorporating metadata.

11. A non transitory computer readable medium comprising computer executable instructions for performing a method of classifying passive interactions with a device, comprising:

obtaining one or more passive inputs from one or more sensors on or coupled to the device, the one or more passive inputs being representative of a passive behaviour of a user relative to the device and being received from a time-based signal;

analyzing the passive inputs using one or more algorithms to extract a list of parameters of a time window and generating a signature of the time window for a phenomenon associated with the passive inputs, generation of the signature including extracting a correlation among the parameters and an evolution of the parameters from the time-based signal; and applying the signature to a pre-trained artificial intelligence algorithm identifying a passive context of use therefrom, to generate an output indicative of the passive context of use and being transmitted to the device for use in an application or functionality on the device.

12. A system for interacting with a device, the system comprising a processor and a memory, the memory storing computer executable instructions that when executed by the processor cause the system to perform a method of classifying passive interactions with a device, comprising:

obtaining one or more passive inputs from one or more sensors on or coupled to the device, the one or more passive inputs being representative of a passive behaviour of a user relative to the device and being received from a time-based signal;

analyzing the passive inputs using one or more algorithms to extract a list of parameters of a time window and generating a signature of the time-based signal for a phenomenon associated with the passive inputs, generation of the signature including extracting a correlation among the parameters and an evolution of the parameters from the time-based signal; and applying the signature to a pre-trained artificial intelligence algorithm identifying a passive context of use therefrom, to generate an output indicative of the passive context of use and being transmitted to the device for use in an application or functionality on the device.

\* \* \* \* \*

UNITED STATES PATENT AND TRADEMARK OFFICE
CERTIFICATE OF CORRECTION

PATENT NO. : 11,574,149 B2
APPLICATION NO. : 16/647065
DATED : February 7, 2023
INVENTOR(S) : Alexandre Desilets-Benoit et al.

It is certified that error appears in the above-identified patent and that said Letters Patent is hereby corrected as shown below:

On the Title Page

Column 1, item (22):
Replace the PCT Filed date of Nov. 14, 2018 with Sep. 14, 2018.

Signed and Sealed this
Ninth Day of May, 2023

Katherine Kelly Vidal
*Director of the United States Patent and Trademark Office*